(12) United States Patent
S. et al.

(10) Patent No.: US 11,356,813 B2
(45) Date of Patent: Jun. 7, 2022

(54) INTERNET OF THINGS FLEET ITEM MONITORING

(71) Applicant: Oracle International Corporation, Redwood Shores, CA (US)

(72) Inventors: Bharath T. S., Bangalore (IN); Rahul Paul, Bangalore (IN); Sourath Roy, Bangalore (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 17/154,442

(22) Filed: Jan. 21, 2021

(65) Prior Publication Data

US 2022/0132274 A1 Apr. 28, 2022

(30) Foreign Application Priority Data

Oct. 22, 2020 (IN) .............................. 202041046082

(51) Int. Cl.
*H04W 4/029* (2018.01)
*G16Y 40/60* (2020.01)
(Continued)

(52) U.S. Cl.
CPC ............. *H04W 4/029* (2018.02); *G16Y 10/40* (2020.01); *G16Y 20/10* (2020.01); *G16Y 40/60* (2020.01); *H04W 4/40* (2018.02); *H04W 84/18* (2013.01)

(58) Field of Classification Search
CPC ....... H04W 4/029; H04W 4/40; H04W 84/18; G16Y 10/40; G16Y 20/10; G16Y 40/60
See application file for complete search history.

(56) References Cited

U.S. PATENT DOCUMENTS 7,755,541 B2 7/2010 Wisherd et al.
10,382,294 B2 8/2019 Bali et al.
(Continued)

FOREIGN PATENT DOCUMENTS

CN 104866999 A 8/2015
CN 107622364 A 1/2018
WO 2019075138 A1 4/2019

OTHER PUBLICATIONS

Unknown, "How it Works", SenseAware, https://www.senseaware.com, last downloaded on Oct. 30, 2020.
(Continued)

*Primary Examiner* — Marcus Hammonds
(74) *Attorney, Agent, or Firm* — Potomac Law Group, PLLC

(57) ABSTRACT

Embodiments monitor items corresponding to a vehicle. Embodiments determine a maximum speed of the vehicle. Embodiments determine a last known first geo-location of a first item, the first geo-location including a first location and corresponding first time and determines a last known second geo-location of a second item, the second geo-location including a second location and corresponding second time. Embodiments determine a reachability radius including a difference between the second time and the first time and multiplying the difference by the maximum speed. Embodiments determine a distance between the first location and the second location and when the distance is greater than the reachability radius, determine that the first item is detached from the second item.

20 Claims, 5 Drawing Sheets

(51) Int. Cl.
    *H04W 4/40*     (2018.01)
    *G16Y 20/10*    (2020.01)
    *H04W 84/18*    (2009.01)
    *G16Y 10/40*    (2020.01)

(56) References Cited

U.S. PATENT DOCUMENTS

| | | | | |
|---|---|---|---|---|
| 10,957,204 | B1* | 3/2021 | Kumar | H04W 52/028 |
| 2010/0007500 | A1 | 1/2010 | Mestres et al. | |
| 2013/0147617 | A1* | 6/2013 | Boling | G08B 21/18 |
| | | | | 340/431 |
| 2016/0232483 | A1 | 8/2016 | London et al. | |
| 2016/0379165 | A1* | 12/2016 | Moakley | G06Q 10/0833 |
| | | | | 705/333 |
| 2017/0127249 | A1* | 5/2017 | Li | H04L 67/12 |
| 2018/0158020 | A1* | 6/2018 | Khasis | G01C 21/3453 |
| 2018/0288566 | A1* | 10/2018 | Lu | H04L 67/18 |
| 2020/0064865 | A1* | 2/2020 | Lei | H04W 52/383 |

OTHER PUBLICATIONS

Unknown, "Managed Solution for High-Value Asset and fleet Tracking", https://www.sierrawireless.com/products-and-solutions/sims-connectivity-and-cloud-services/managed-iot-solutions/asset-tracking/ 1/, last downloaded on Oct. 30, 2020.

Unknown, "SenseAware is FedEx's IoT response to supply chain optimization", htpps://www.rcrwireless.com/20160929/big-data-anlytics/fedex-iot-tag31, last downloaded on Oct. 30, 2020.

Unknown, "What is SenseAware?", www.senseaware.com, last downloaded on Oct. 30, 2020.

Unknown, Domo IoT Asset Tracking, https://webcache.googleusercontent.com/search?q=cache:A9f7PEUpR_gJ: https://aws.amazon.com/iot/solutions/DomoVerizon/+&cd=1&hl=en&ct=clnk&gl=us, last downloaded on Oct. 30, 2020.

* cited by examiner

INTERNET OF THINGS FLEET ITEM MONITORING

FIELD

One embodiment is directed generally to a computer system, and in particular to fleet monitoring using a computer system.

BACKGROUND INFORMATION

Large quantities of cargo are transported daily across the continental US and in most other industrial countries using transportation carriers. The use of tractor-trailers as cargo transport vehicles provided by the trucking industry accounts for a significant portion of the vehicles utilized to transport cargo, typically in the form of a "fleet" of trucks. In the trucking industry, cargo is arranged to be transported from an origination point to a destination point via a particular tractor-trailer, driven by an operator/driver.

Each shipped cargo is valuable to the parties involved in the shipment transaction, from the shipper, the brokerage service, the trucker (or truck driver/operator), and the recipient. Therefore, the security of the cargo once the cargo leaves the origination/shipping point is of concern. With conventional trucking, the security aspects of the cargo have been primarily based on the operator being diligent in the field as the tractor-trailer is moved along a selected delivery route.

Unfortunately, the value of these cargo and/or their transport vehicles can often be attractive to others who have no ownership or financial interest in the shipment, and those persons may desire to steal the cargo and/or the transport vehicle for various reasons, including financial or otherwise. Even a diligent operator is not be able to detect when activities are occurring in or around the shipment and the tractor-trailer or other transport vehicle that negatively affects the shipment and/or jeopardizes or prevents the completion of the shipment delivery. Beyond theft, cargo and or truck trailers can be lost due to non-malicious reasons such as neglect or accidents.

SUMMARY

Embodiments monitor items corresponding to a vehicle. Embodiments determine a maximum speed of the vehicle. Embodiments determine a last known first geo-location of a first item, the first geo-location including a first location and corresponding first time and determines a last known second geo-location of a second item, the second geo-location including a second location and corresponding second time. Embodiments determine a reachability radius including a difference between the second time and the first time and multiplying the difference by the maximum speed. Embodiments determine a distance between the first location and the second location and when the distance is greater than the reachability radius, determine that the first item is detached from the second item.

DETAILED DESCRIPTION

Embodiments track and provide real time detection of detachment of trip items and trip inventories during transportation while monitoring a fleet of trucks or other elements. Embodiments use geo-location sensors and determine a reachability radius, which is a function of time and maximum speed and provides the relative positions of the trip entities in terms of reachability between the entities.

Reference will now be made in detail to the embodiments of the present disclosure, examples of which are illustrated in the accompanying drawings. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, components, and circuits have not been described in detail so as not to unnecessarily obscure aspects of the embodiments. Wherever possible, like reference numbers will be used for like elements.

Figure 1:
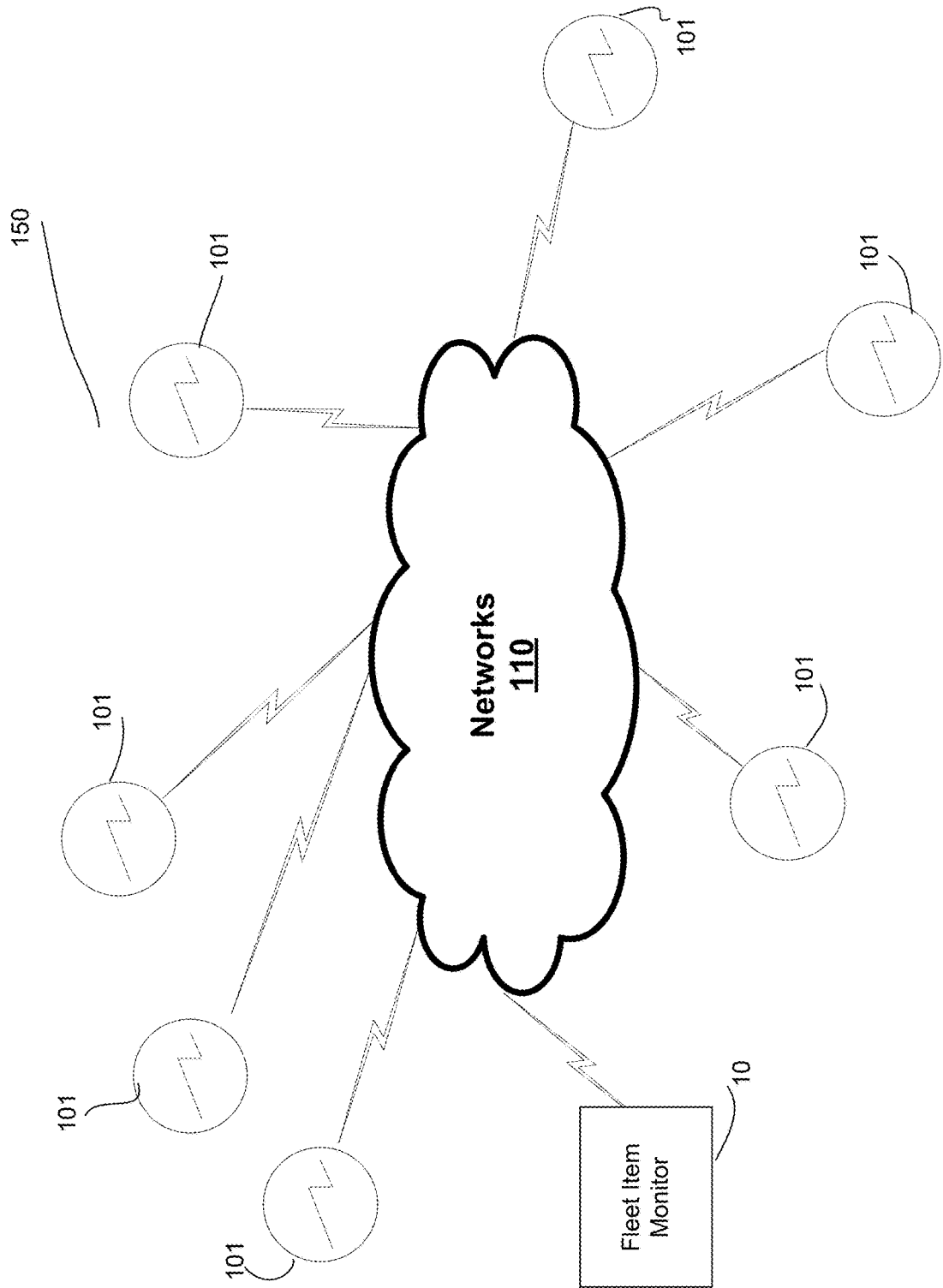
FIG. 1 is an overview diagram of elements of a fleet item monitoring network/system that can implement embodiments of the invention.

FIG. 1 is an overview diagram of elements of a fleet item monitoring network/system 150 that can implement embodiments of the invention. Network 150 includes multiple sensors 101 that form a sensor network 150 in combination with one or more networks 110. Each of sensors 101 can be considered an Internet of Things ("IoT") device with the associated processing and communication capabilities. System 150 may include a relatively large number of sensors 101. For example, for a fleet of "trucks" that are being monitored, each portion of the truck may include a sensor (e.g., the actual truck body and the one or more trailers that are being pulled by the truck, and each item that is loaded into each of the trailers).

An IoT device can be any device that has a sensor attached to it and can transmit data from one object to another or to people with the help of Internet. IoT devices include wireless sensors, software, actuators, and computer devices. They are attached to a particular object that operates through the Internet, enabling the transfer of data among objects or people automatically without human intervention. Each of sensors 101 can include a processor/controller, and a communication interface that uses protocols such as Modbus, Zigbee, or proprietary protocols, to connect to an Edge Gateway.

Network 150 may be used for a variety of purposes, such as, for example, in the transportation industry, where vehicle fleet management is aided by the continuous acquisition of data by sensors that are attached to vehicles. In this embodiment, sensor network 150 may acquire data that may be monitored and processed for such purposes as aiding vehicle maintenance, optimizing vehicle routes, promoting driver safety, etc. Each of sensors 101 communicate, wirelessly or wired, through one or more networks 110. Networks 110 include the Internet, but may also include private on-premise networks that ultimately interface with the Internet as well as any other type of network that allows sensors 101 to communicate.

A fleet item monitor 10 is coupled to networks 110 to send and receive data from sensors 101. Fleet item monitor 10 provides the fleet item monitoring functionality disclosed herein. In general, fleet item monitor 10 monitors data acquired by each of sensors 101 for purposes of detecting incidents of items being detached and separated from the rest of the transported items, due to malicious activity or any other reason.

Figure 2:
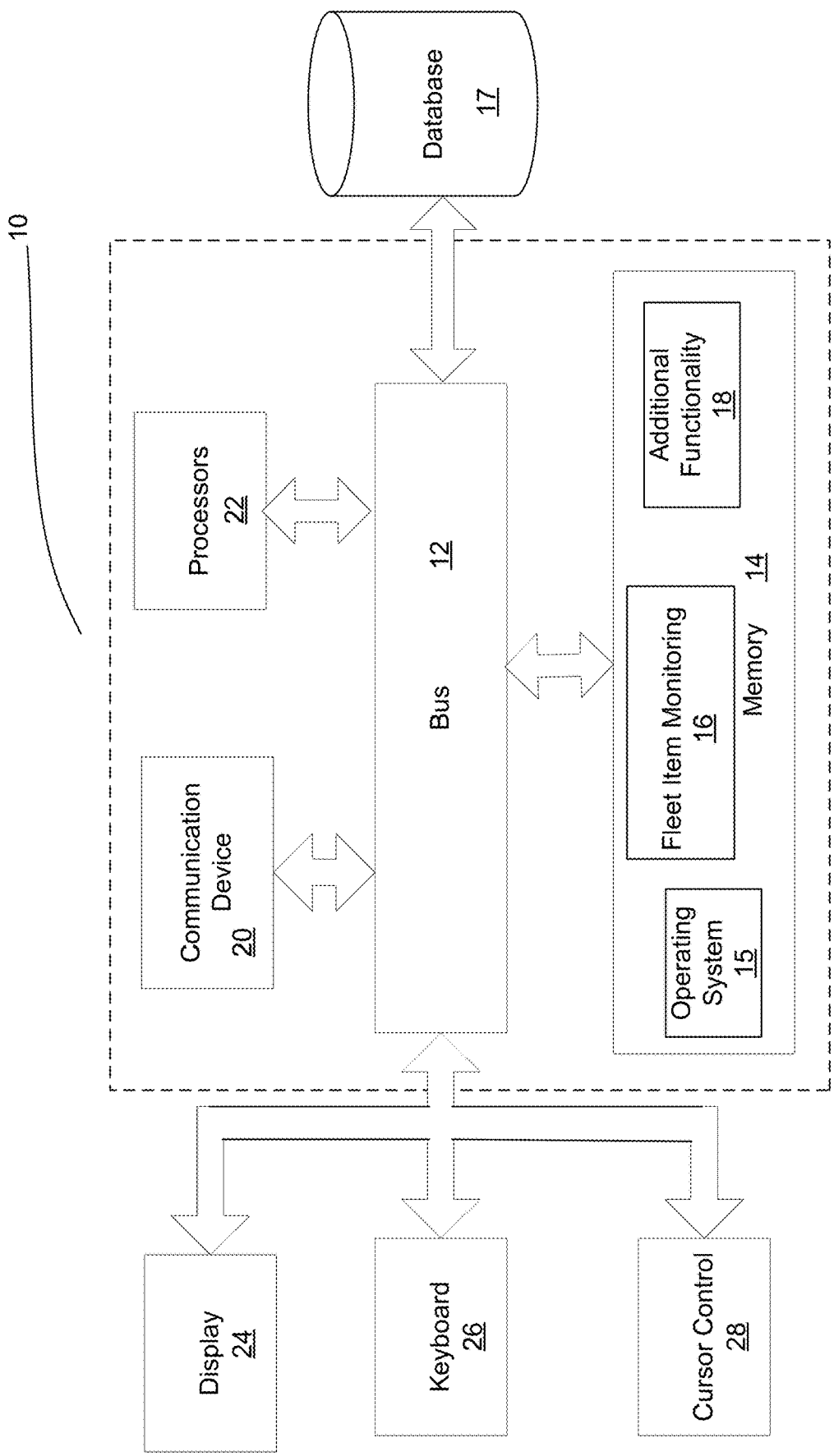
FIG. 2 is a block diagram of the fleet item monitor of FIG. 1 in the form of a computer server/system in accordance with an embodiment of the present invention.

FIG. 2 is a block diagram of fleet item monitor 10 of FIG. 1 in the form of a computer server/system 10 in accordance with an embodiment of the present invention. Although shown as a single system, the functionality of system 10 can be implemented as a distributed system. Further, the functionality disclosed herein can be implemented on separate servers or devices that may be coupled together over a network. Further, one or more components of system 10 may not be included.

System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer readable media. System 10 further includes a communication device 20, such as a network interface card, to provide access to a network. Therefore, a user may interface with system 10 directly, or remotely through a network, or any other method.

Computer readable media may be any available media that can be accessed by processor 22 and includes both volatile and nonvolatile media, removable and non-removable media, and communication media. Communication media may include computer readable instructions, data structures, program modules, or other data in a modulated data signal such as a carrier wave or other transport mechanism, and includes any information delivery media.

Processor 22 is further coupled via bus 12 to a display 24, such as a Liquid Crystal Display ("LCD"). A keyboard 26 and a cursor control device 28, such as a computer mouse, are further coupled to bus 12 to enable a user to interface with system 10.

In one embodiment, memory 14 stores software modules that provide functionality when executed by processor 22. The modules include an operating system 15 that provides operating system functionality for system 10. The modules further include a fleet item monitoring module 16 that monitors fleets and/or individual vehicles and detects detachment of items from other items, and all other functionality disclosed herein. System 10 can be part of a larger system. Therefore, system 10 can include one or more additional functional modules 18 to include the additional functionality, such as the "IoT Asset Monitoring Cloud Service" or "IoT Fleet Monitoring Cloud" from Oracle Corp. A file storage device or database 17 is coupled to bus 12 to provide centralized storage for modules 16 and 18, including data generated by the sensors in the form of messages or data points. In one embodiment, database 17 is a relational database management system ("RDBMS") that can use Structured Query Language ("SQL") to manage the stored data.

In one embodiment, particularly when there are a large number of distributed files at a single device, database 17 is implemented as an in-memory database ("IMDB"). An IMDB is a database management system that primarily relies on main memory for computer data storage. It is contrasted with database management systems that employ a disk storage mechanism. Main memory databases are faster than disk-optimized databases because disk access is slower than memory access, the internal optimization algorithms are simpler and execute fewer CPU instructions. Accessing data in memory eliminates seek time when querying the data, which provides faster and more predictable performance than disk.

In one embodiment, database 17, when implemented as an IMDB, is implemented based on a distributed data grid. A distributed data grid is a system in which a collection of computer servers work together in one or more clusters to manage information and related operations, such as computations, within a distributed or clustered environment. A distributed data grid can be used to manage application objects and data that are shared across the servers. A distributed data grid provides low response time, high throughput, predictable scalability, continuous availability, and information reliability. In particular examples, distributed data grids, such as, e.g., the "Oracle Coherence" data grid from Oracle Corp., store information in-memory to achieve higher performance, and employ redundancy in keeping copies of that information synchronized across multiple servers, thus ensuring resiliency of the system and continued availability of the data in the event of failure of a server.

In one embodiment, system 10 is a computing/data processing system including an application or collection of distributed applications for enterprise organizations, and may also implement logistics, manufacturing, and inventory management functionality. The applications and computing system 10 may be configured to operate with or be implemented as a cloud-based networking system, a software-as-a-service ("SaaS") architecture, or other type of computing solution.

As discussed, there is a need to monitor items that are being shipped by transportation vehicles, alone or part of a fleet, as well as the inventories that are used to carry out the trip (e.g., truck trailers, racks that hold the items, etc.), collectively referred to as "items". For example, there could be circumstances where the items or inventories can get detached or dropped off from the rest of the trip entities, at unplanned locations along the path of the trip, either accidentally or due to adverse incidents.

There is a need to monitor and detect such events as early as possible and alert the user so corrective actions can be taken. For example, if a truck trailer is stolen, there is a need to immediately notify the authorities. However, known solutions to detect a detachment of a truck trailer is generally based on monitoring a proximity distance between the entities. A threshold distance or radius will be defined for the proximity distance, and if the separation between the entities is beyond this threshold, then the entities are considered to be separated. This threshold distance is defined based on the required accuracy and the sensitivity of the sensors.

Known solutions attach geo-location sensors (e.g., IoT sensors with Global Positioning System ("GPS") functionality) to the items and inventories. The sensors will send geo-location messages (i.e., messages that provide the location of the corresponding item) to a server and the server may receive and process these messages at some standard time interval (e.g., every 5 minutes). The sensors attached to the entities generally record the geo-location information and send messages at their predefined time intervals, and therefore the geo-location information received at the server will be spread out in time across all of the sensors. Further, if the entities are in constant motion, then the location indicated by each of the messages will also be spread out over some area. Therefore, in most real-world situations, the geo-location messages received at the server will have recorded timestamps spread out over a time interval and the recorded locations spread out over an area.

However, known solutions, using the above data, can accurately detect that a separation of an item from the rest of the trip has taken place only when the minimum distance between the separated entities grows beyond a reasonably defined threshold distance. Generally, this defined threshold is at least 5 km in order for the server to accurately detect the detachment. However, to reach such a minimum distance of separation between the entities, the time required could be very long. Further, in known solutions the recorded timing information from the geo-location messages is completely ignored while determining the separation between the entities.

In contrast, embodiments provide for a quicker automatic detection of a detachment of an item from the other items for an individual truck or fleet, such as a package or trailer being removed from the truck. This allows the user can take cognizance of the detachment and act upon it as quickly as possible.

As an illustration of the deficiencies of known solutions, consider an example of a vehicle carrying some items. An item which has a corresponding geo-location sensor gets dropped off along the route. This detachment incident can get detected automatically by the server only after the rest of the vehicle and inventories have travelled a considerable distance away from the detached item, such as 5 km. The time taken for the minimum separation distance between all the travelling entities and the dropped off entity to grow to 5 km, may be, for example, 10 mins (e.g., for a vehicle at 60 km/hr speed) or 20 mins (e.g., for a vehicle at 30 km/hr speed). Among other dependencies, the speed of the vehicle can also depend on if the vehicle is moving on a highway, or if the vehicle is moving among city traffic. Even if the geo-location messages from each of the sensors are available at less than 5 min intervals the time taken for the detachment detection, in a best case scenario, will generally be at least 10 mins.

Further, as the speed of the vehicle carrying the entities decreases, more time is required for the separation distance to grow to the threshold value, and hence more time is required to detect the detachment. The speed of the vehicle can decrease due to many factors such as traffic conditions, a low posted speed limit on the route segment, a lesser engine capacity of the vehicle, etc. Further, with known solutions, any attempt to reduce the separation distance and therefore an attempt to reduce the time to detect the detachment would only increase chances of false detection.

As described, known solutions to monitoring items for separation implement an absolute threshold distance between the inventories. In these known solutions, the geo-locations of the inventories are looked at from a static frame of reference and the proximity distance between the entities is compared with a static threshold distance to determine the separation between the entities.

In contrast, instead of using an absolute static threshold for the separation, embodiments implement a dynamically calculated "reachability radius." The reachability radius is also a function of time, and it considers the timing difference between the last known geo-location recordings. Instead of looking at the proximity distance between the inventories, embodiments evaluate the reachability between the entities.

In embodiments, the reachability radius is as follows: The reachability radius (r) is a function of time (t) and the maximum speed (Vmax). More specifically:

$$\text{Reachability radius} = r = r(t, V_{max}) = (V_{max} \times t) = \text{Product of ``}V_{max}\text{'' and ``}t\text{''}$$

For any particular time-interval (t), the reachability radius (r) provides the maximum radius from a particular point of reference within which another entity can be considered as being "reachable" by travelling at the maximum speed ($V_{max}$) from that point of reference. The terms are defined as follows:
 1) The maximum speed ($V_{max}$) is the maximum limit for the speed of the entities of the trip due to any of the following example list of variables:
    a. Maximum speed capacity of the vehicle carrying the entities;
    b. Posted speed limit at any particular segment of the route, provided by a map service provider;
    c. Maximum speed practically possible due to the traffic conditions at the particular time of the day.
 2) The time-interval (t) is the time difference between the recordings of the geo-location messages coming from the entities considered for the evaluation of separation.

The reachability radius (r), determines the radius from an entity of reference within which another entity can be considered as being attached with that entity of reference. In contrast, if the other entity is beyond the reachability radius (r), it means that the entity is detached from the entity of reference considered. The entity or the point of reference can be a dynamic entity of reference. For example, it can be the vehicle/truck or it can be any other entity of the trip depending on the available set of geo-location messages.

This concept of reachability radius can also be understood by the considering an example imaginary vehicle. Assume that an imaginary vehicle is carrying two entities being considered/tracked (e.g., a truck trailer and a package transported within the truck trailer). Consider the last known geo-location recordings from these entities. As discussed above, these geo-location recordings will have their recording time spread out in time (i.e., the variable 't' used in the above formula) and their geo-locations spread out over some area (an area covering the separation distance between the entities). For these two entities to be considered together, a vehicle can be assumed to be carrying the two entities. Then, with this assumption, the speed of this assumed imaginary vehicle can be determined by using the last known geo-location messages from the two entities. If the speed thus computed is within the maximum practical value (the variable "$V_{max}$" used in the above formula), then the imaginary vehicle must be a real vehicle carrying the entities, and hence the entities must be travelling together. Otherwise, if the speed thus computed is more than the maximum practical value ("$V_{max}$"), then the imaginary vehicle cannot be practically real, and hence the entities must be considered as detached from each other. This implies that the separation distance between the entities is because they have moved apart relative to each other (i.e., they are detached from each other).

Figure 3:
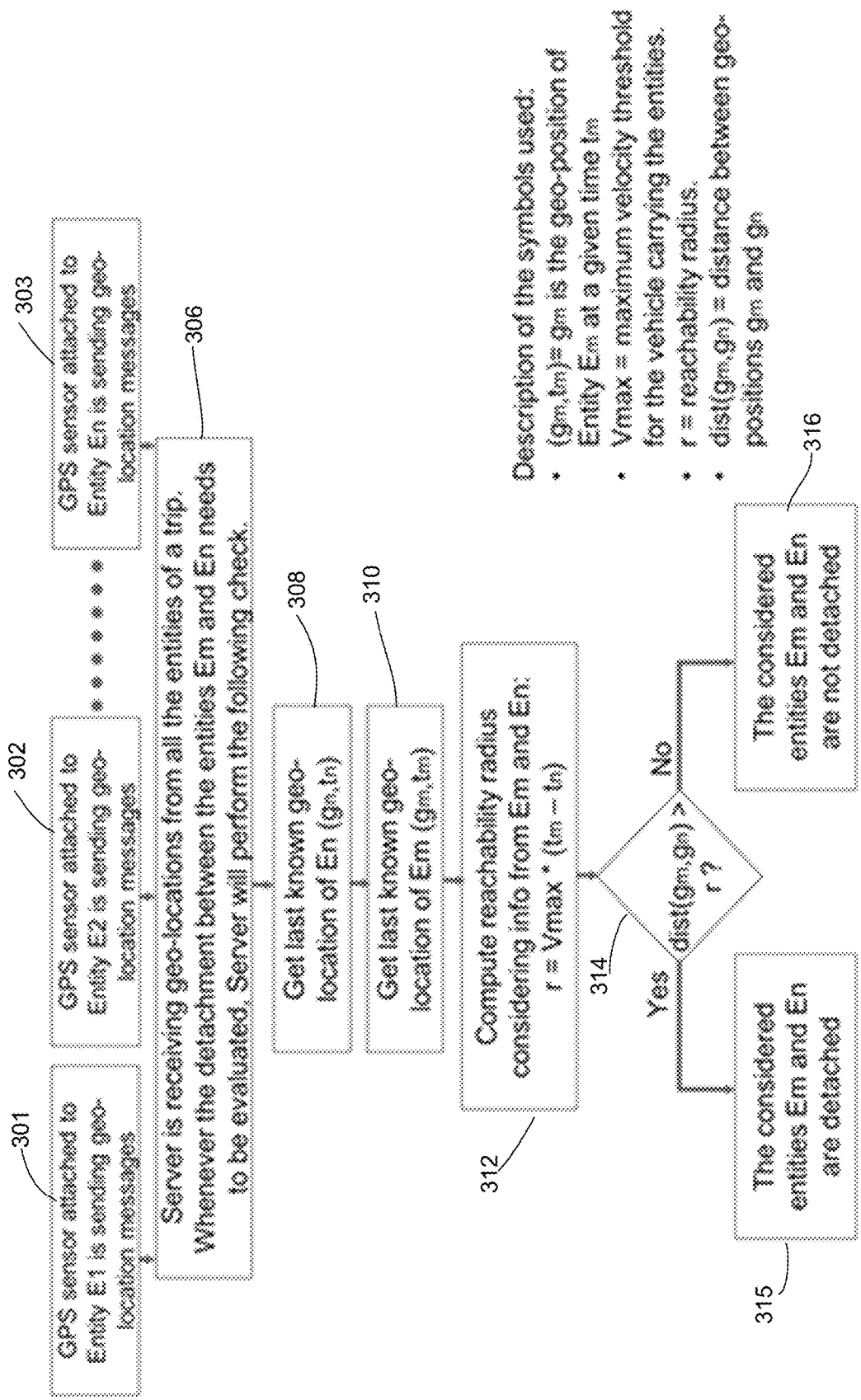
FIG. 3 illustrates a flow diagram of the functionality of the fleet item monitor of FIG. 1 when monitoring fleet items and determining when items become detached from other items in accordance to embodiments.

FIG. 3 illustrates a flow diagram of the functionality of fleet item monitor 10 of FIG. 1 when monitoring fleet items and determining when items become detached from other items in accordance to embodiments. In one embodiment, the functionality of FIG. 3 (and FIG. 4 below) is implemented by software stored in memory or other computer-readable or tangible medium, and executed by a processor. In other embodiments, each functionality may be performed by hardware (e.g., through the use of an application specific integrated circuit ("ASIC"), a programmable gate array ("PGA"), a field programmable gate array ("FPGA"), etc.), or any combination of hardware and software.

Each of the tracked items, which can include, for each fleet vehicle, a truck body, one or more trailers that are towed by the truck, and up to every item be transported in the trailers. Each tracked item has a corresponding sensor 101 (e.g., an IoT sensor) that transmits the location of the item at predetermined time intervals, in the form of messages. The messages are received by fleet item monitor 10.

The functionality of FIG. 3 is for a single vehicle among a fleet of vehicles, and for tracking all items that correspond to that vehicle. Assume the vehicle corresponds to and/or carries the following entities: E1, E2, E3, ... $E_m$, $E_n$, ... etc. At 301-303, each of the entities (including the vehicle) will be sending geo-locations at some frequency depending on the geo-location sensor attached to them. The frequencies of each sensor typically will be different. In general, each sensor 101 may or may not have the same frequency, and each sensor may or may not send the location message at the same time. Therefore, monitoring server 10 does not expect or enforce sensors 101 to have same frequency or same timing for sending their location. Similarly, server 10 does not expect or enforce sensor 101 to have different frequency and timing. However, in most practical scenarios, sensors 101 will have different frequency and timing of sending messages.

In scenarios where the frequency and timing of sending the messages is exactly same for all of sensors 101, then the reachability radius is essentially "0". However, practical purposes, in such cases a value of 100 m (or less, depending on the accuracy of the geo-location sensors 101) can be used for the reachability radius.

At 306, the server/monitor 10 will be receiving the geo-location messages from each of the entities as they are sent. At any given point of time, monitor 10 will have the last known geo-location pings (the geo-position "g" at a corresponding given time "t"): $(g_1, t_1), (g_2, t_2), (g_3, t_3), \ldots (g_m, t_m), (g_n, t_n), \ldots$ etc. from each of entities, as long as that entity is sending/broadcasting their geo-location information to monitor 10. Whenever the detachment between any pair of entities $E_m$ and $E_n$ needs to be evaluated, the following functionality beginning at 308 will be performed for the pair of entities.

The pair of entities, $E_m$ and $E_n$, can be selected at 306 using different techniques. In one embodiment, the pair of entities determined using a clustering algorithm disclosed in detail in FIG. 4 below. The clustering algorithm groups all of the entities that are attached together into a single cluster of entities, and groups all of the entities that are not attached together into different clusters. For the determination of the reachability radius beginning at 308, each cluster will be considered a single entity, with the latest geo-location information from among its entities as the cluster's geo-location information. If an attachment is detected between the considered cluster and the considered entity then the entity will be assigned to the considered cluster. If a detachment is detected between the considered cluster and the considered entity, then the entity is evaluated for attachment against the next available cluster, or if there are no other clusters then the entity will be assigned a new cluster. The clustering algorithm is executed between the following: (a) the entity—sending its location message update; and b) each of the cluster. The entity will be assigned to the cluster that the entity is considered to be attached to.

At 308, the last known geo-location of $E_n$ ($g_n$, $t_n$) is retrieved, where $g_n$ is the geo-position of entity $E_n$ at a given time $t_n$.

At 310, the last known geo-location of $E_m$ ($g_m$, $t_m$) is retrieved, where $g_m$ is the geo-position of entity $E_m$ at a given time $t_m$.

At 312, the information from $E_m$ and $E_n$ retrieved at 306 is used to determine the reachability radius (r) for $E_m$ and $E_n$ as follows:

$$r = V_{max} * (t_m - t_n).$$

Where $V_{max}$ is the maximum velocity threshold for the vehicle carrying the entities. $V_{max}$ in embodiments is a configured constant, but may be revised based on user preference.

In determining a value for $V_{max}$, a consideration is made that the smaller the $V_{max}$, the smaller will be the reachability radius, and hence smaller will be the latency in detection of a detachment. But reducing the $V_{max}$ to too small a value would result in false positives of detachment. For a simplest embodiment, $V_{max}$ can be kept constant for a trip. $V_{max}$ can be determined based on the mode of transport, capacity of the vehicle, and other relevant parameters of the trip. Some examples of how $V_{max}$ can be determined include:

(1) If the vehicle that is used for the trip is a truck which is capable of travelling at 200 km/hr speed, then the $V_{max}$ is set to 200 km/hr. This value can be used as $V_{max}$ for any road trip if the truck's maximum speed cannot exceed 200 km/hr.

(2) If information about the vehicle and the load being carried is known, then the $V_{max}$ can be further reduced. If the load carried is higher for the trip and causes the maximum speed of the truck to be reduced due to the load then, for example, the $V_{max}$ can be reduced to 150 km/hr for the particular trip. If the entities are carried using a train then the $V_{max}$ can be further set to a higher (or lower) value depending on the maximum speed of the train being used.

(3) If detachment is required to be detected with even more reduced latency, then a variable $V_{max}$ can be used for a trip. The configured $V_{max}$ can be constantly updated based on the inputs from a map-route service provider. A map-route service can determine the average velocity of the traffic movement at any point of time for any particular location in the map. If the vehicle is moving in a city traffic, and based on the traffic conditions the map-route provider says that the average velocity for any vehicle is 60 km/hr at that time, then $V_{max}$ can conservatively be set as 120 km/hr. If the vehicle is moving on a state highway or national highway and the map-route provider says that the average velocity for any vehicle is 120 km/hr then $V_{max}$ can conservatively be set as 200 km/hr.

At 314, if the distance between the geo-locations $g_m$ and $g_n$ is greater than the reachability radius (r) then the entities $E_m$ and $E_n$ are considered to be detached from each other at 315. If distance between the geo-locations $g_m$ and $g_n$ is lesser than the reachability radius (r) then the entities $E_m$ and $E_n$ are considered to be not detached at 316. If the entities are considered to be detached, additional actions are taken such as generating an alert, disabling the item that is detached (e.g., if an electronic item includes sensitive and confidential information), etc.

Figure 4:
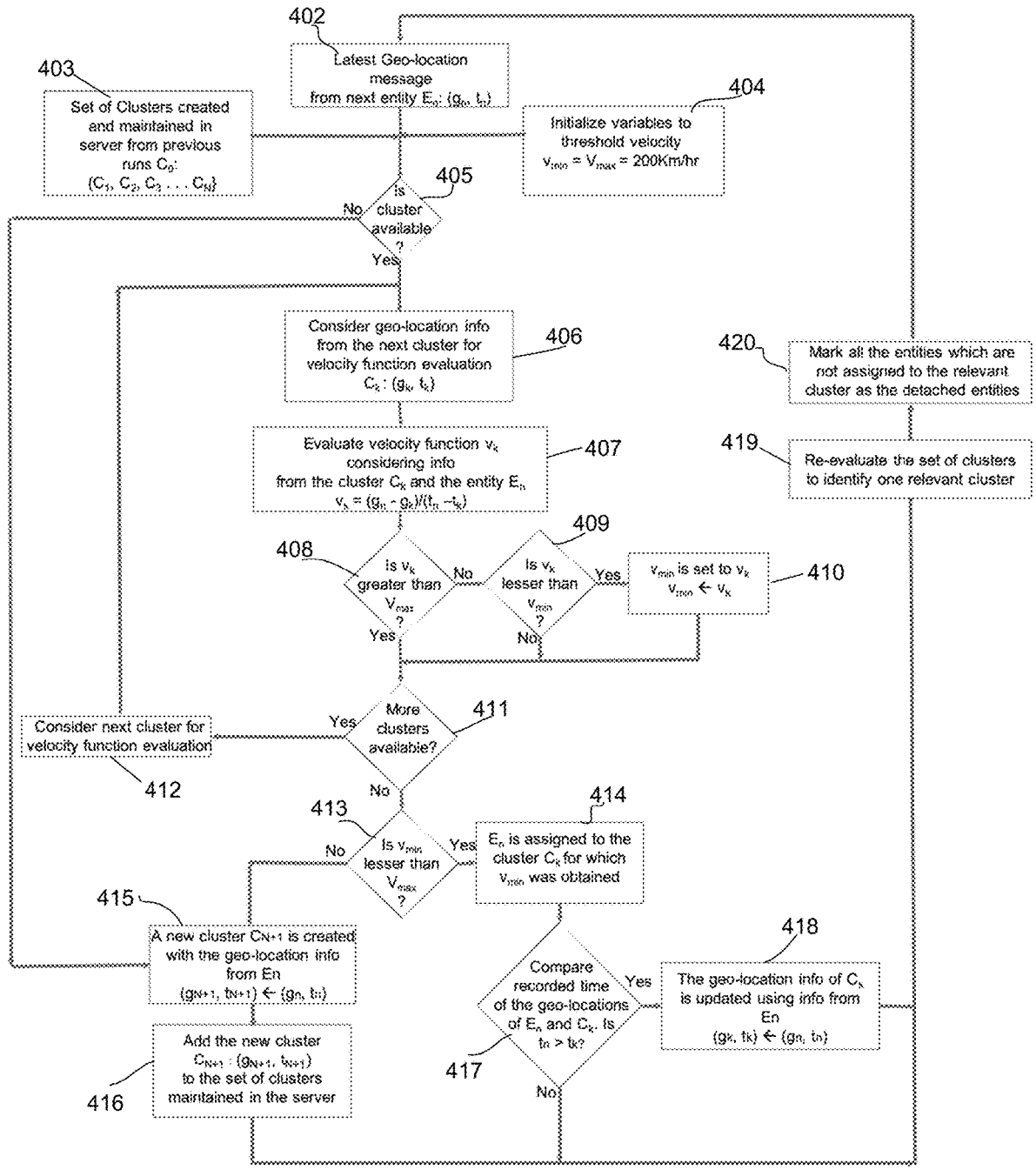
FIG. 4 is a flow diagram of functionality of the fleet item monitor of FIG. 1 when clustering entities in a plurality of clusters $C_1, C_2, C_3 \ldots C_n$ in accordance to embodiments.

At 315, in one embodiment, it is also determined which of the items $E_m$ and $E_n$ are detached from the vehicle itself as opposed to only each other by determining the "relevant" cluster based on the output of the clustering algorithm of FIG. 4. Based on the output from the clustering algorithm of FIG. 4 (at 419), if there are more than one clusters for the trip, then only one cluster will be determined to be the relevant cluster to the trip. In a simplest case—where the vehicle is sending periodic geo-location information, the cluster which contains the vehicle can be considered as the relevant cluster. Any entity which is not belonging to the relevant cluster will be considered as detached from the vehicle.

In order to determine one particular cluster as the relevant cluster, the following is determined:
(1) The cluster which contains the vehicle is marked as the relevant cluster.
(2) If the geo-location information for the vehicle is not available (either because the vehicle does not have a geo-location sensor attached, or the sensor has stopped sending the location information) then the relevant cluster of entities can be determined based on the any of the following:
 a) The cluster which is closer to the next scheduled stop is marked as the relevant cluster.
 b) The cluster which is within the geo-fence of the planned trip route is marked as the relevant cluster.

FIG. 4 is a flow diagram of functionality of fleet item monitor 10 of FIG. 1 when clustering entities in a plurality of clusters $C_1, C_2, C_3 \ldots C_n$ in accordance to embodiments. The functionality of FIG. 4 runs in a continuous loop in embodiments. In embodiments, the clustering of FIG. 4 is implemented using artificial intelligence/machine learning.

At 402, the latest geo-location message from the next entity $E_n$ is received. At 403, a set of clusters from previous runs is maintained, and at 404 the variables are initialized to the threshold velocity $V_{max}$.

At 405, if a cluster is available, the geo-location information for the next cluster $C_k$ is considered at 406, and the velocity function $V_k$ is evaluated at 407 considering information from the cluster $C_k$ and the entity $E_n$.

At 408-410, $V_k$ is compared to $V_{min}$ and $V_{max}$. If there are more clusters available at 411, the next cluster is considered at 412.

If $V_{min}$ is less than $V_{max}$ at 413, then $E_n$ is assigned to the cluster $C_k$ for which $V_{min}$ was obtained at 414. Otherwise, at 415 a new cluster is created. The new cluster is added to the set of clusters at 416.

At 417, the recorded times of $C_k$ and $E_n$ is compared. If $t_n$ is greater than $t_k$, the geo-location for $C_k$ is updated at 418.

At 419, the set of clusters is re-evaluated to identify one relevant cluster. At 420, all entities which are not assigned to the relevant cluster are considered detached entities. Functionality then resumes at 402.

As an example of embodiments of the invention, consider the same scenario described above. A vehicle is carrying some items. An item which has a geo-location sensor gets dropped off along the route. This detachment incident can get detected automatically, by the server, based on the sensor data available using embodiments of the invention as follows:

Advantage 1: Early Detection of Detachment

If the geo-location messages from each of the sensors are available at 1 min intervals:

$$\text{Considering } V_{max} = 120 \text{ km/hr} = 2 \text{ km/min},$$
$$\text{Reachability radius } (r) = 2 \text{ km}$$

Then as soon as the separation distance between the entities is 2 km the server will be able to mark the entities as detached. In this example, the time needed to detect the detachment is the time taken for the distance to grow 2 km, which is 4 min (for a vehicle at 30 km/hr speed) or even 2 min (for a vehicle at 60 km/hr speed).

As compared with known solutions disclosed above which took either 10 min or 5 min to detect separation, embodiments have reduced the time required for the detection of detachment to 4 min or 2 min, respectively. This will be further reduced if the time interval between the sensors of the two entities is reduced. For example, if the time interval between the two entities geo-location reading is 5 seconds, then 5 seconds is the time required to detect the detachment between the two entities.

Advantage-2: No False Positives During Detection of Detachment

Consider an example where one of the entities has not sent the geo-location information for the past 5 mins. Then, comparing with the latest geo-location from another entity, the separation between the considered entities can be 5 km (for a vehicle at speed 60 km/hr).

In this case, known solutions would mark the entities as detached. In contrast, with embodiments of the invention, the entities will not be marked as detached because the timing information between the two geo-location readings is also considered as follows:

$$\text{Reachability radius} =$$
$$V_{max} * \text{time interval} = 100 \text{ kmph} * 5 \text{ min} = 100/12 = 8.3 \text{ km}$$

Thus, the reachability radius >5 km, which means the entities are not marked as detached.

Therefore, embodiments use the recorded time of a geo-location information of an entity, along with the maximum speed value, to decide if a particular entity is within the reachability radius or not, from a considered entity of reference. A dynamic frame of reference is used to evaluate the separation. Therefore, embodiments, by using the concept of "reachability radius", reduce the time latency and improve the accuracy of detection of separation between the entities.

Embodiments use the reachability radius for clustering the various connected inventories and entities of a trip, that takes into consideration the time dimension along with the Euclidian distance.

In embodiments where there are a large number of IoT sensors 101, and/or some sensors are used for fleet monitoring as disclosed above, while other sensors are used for other types of functionality, a gateway between the sensors and the cloud (which can include fleet item monitor 10) is implemented. Examples of other types of functionality for sensors 101 include measurement of temperature, humidity, CO2 levels, GPS, water level, water presence, electrical current/voltage, light, presence, etc. Small sensors or legacy devices can directly transmit their data to a nearby gateway instead of to the cloud, reducing their power consumption and increasing the sensors' battery life.

The gateway communicates with different types of sensors/devices using different protocols and then sends the data to a cloud service using a standard protocol. The gateway acts as a filter for the huge amount of data sent by the devices, processing the data and sending only relevant information to the cloud. Therefore, the processing and storage services is utilized optimally so that the need for processing and storage is reduced. Further, the response time for the sensors is considerably reduced. The nearby gateway receives the sensor data, processes it, and sends relevant commands back to the sensors. Further, gateways are highly secure and they also help secure the sensors and devices that are connected to them.

Figure 5:
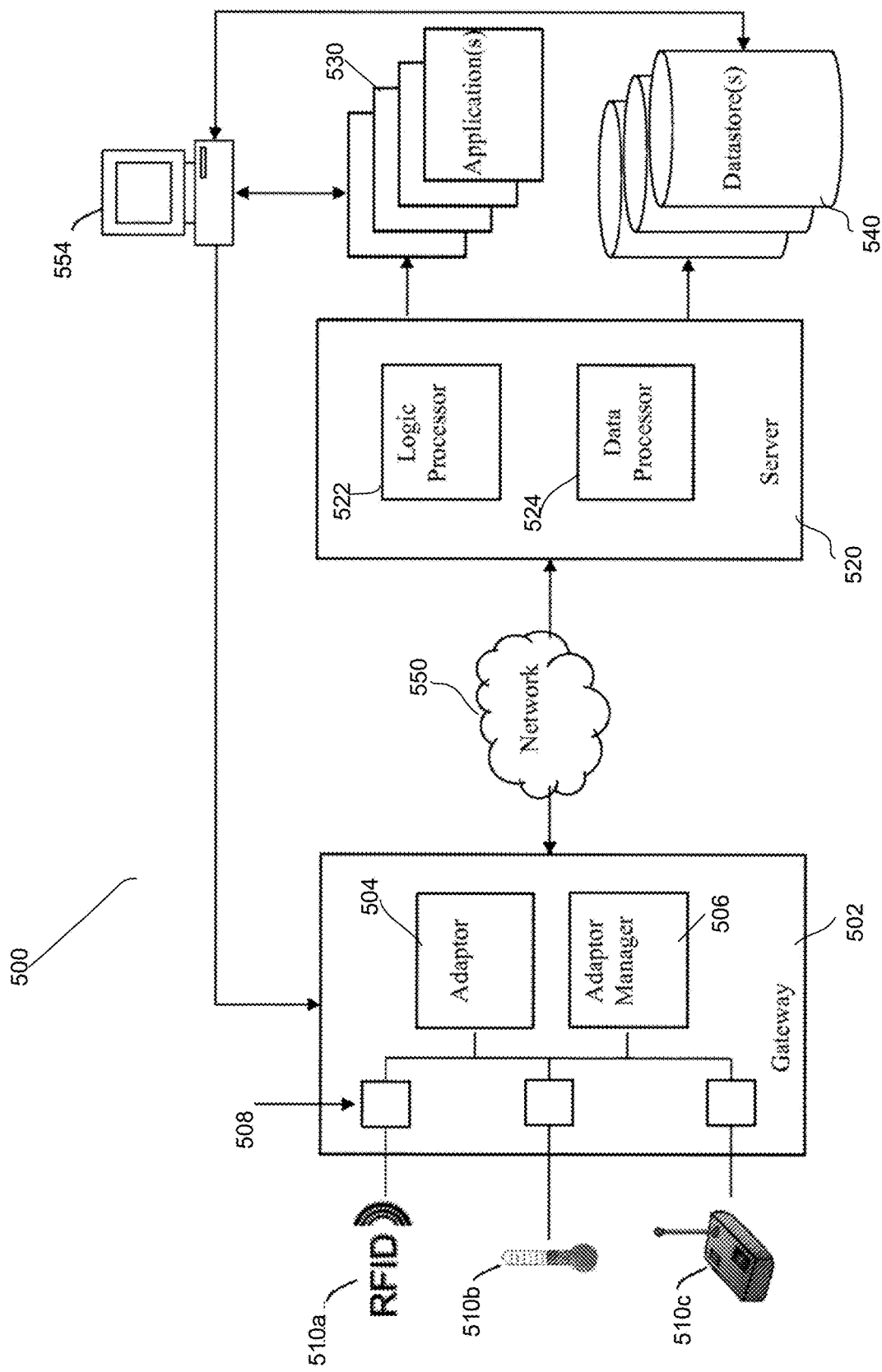
FIG. 5 is a block diagram of a gateway architecture in accordance with embodiments of the invention.

FIG. 5 is a block diagram of a gateway architecture 500 in accordance to embodiments of the invention. Architecture 500 permits effective integration between the systems in the operations technology portion and the systems in the information technology portion of the environment. Architecture 500 generally includes a gateway portion 502 having front-end data collection logic, and a server portion 520 to perform back-end processing of the collected data. To handle many different device/sensor types (including IoT sensors 101) and to provide the ability to handle high numbers of units being deployed in the field, embodiments provide a robust platform for handling issues such as: (a) sensor definition; (b) sensor management; (c) data capture; (d) data processing; (e) data transfer; (f) data storage; (g) analysis; and/or (h) visualizations. This architecture provides a framework for interfacing with any type of local device that may be deployed at a client site, and to allow data captured from those devices to be sent to a remote server, and to have the collected data be both locally and remotely programmatically processed.

Gateway 502 includes a sensor management module that handles the sensor code (e.g., that is implemented as custom code, such as Java code, specific to each sensor hardware). This module captures the sensor data in a generic way so that any type of data can be used. The gateway locally caches data so it can be pre-processed locally and no data is lost when there is no network connectivity. The data preprocessor performs actions such as data filtering using a set of rules. The system throttles the data so that data rates do not overwhelm the capabilities of the client gateway or the network. An internal data store may be included to store data in a platform-agnostic way. A data transfer module is employed to build the data for transmission. The system permits client gateways to talk to each other so as to establish a mesh network ensuring resiliency and connectedness.

In general, gateway 502 performs data acquisition and management of local devices 510a-c. The local devices 510a-c may include any type of equipment that can be suitably managed by architecture 500. For example, any number of sensors may be embedded within the local equipment at various sites. Examples of such sensors include RFID sensors at device 510a, temperature sensors at device 510b, and other types of smart devices, beacons, and/or machines at device 510c (including IoT sensors 101).

Local devices 510a-c can be configured to send data at regular intervals to gateway 502. Such data may include information to be captured from the local devices. For example, information that may be captured include operating conditions, metrics, pressure, vibration, temperature, and/or flow rate.

In additional to using sensor data to determine item detachment, as disclosed above, other examples of the uses for sensor data may include: (a) handling perishable goods, where the system continuously monitors the temperature, humidity and location of goods as they travel through the supply chain, where by monitoring these critical factors and taking quick action on alerts, one can significantly reduce the spoiled goods and as a result increase revenue; (b) managing heavy machinery, by tracking the locations of a company's equipment along with environment conditions and operating metrics of the equipment, thereby ensuring that the equipment is being operated properly, preventing machine failures, and ensuring that the equipment is being properly used to the organization's goods and services; and (c) providing product support, where products that are sold could communicate back to the maintenance organization with current status, diagnostic information, and available quantity of consumables, and where the provided information helps to deliver a better quality of service to customers by discovering potential failures before they impact the customer and also increase revenue through expanded service offerings and replenishment of consumables.

Gateway 502 includes an adaptor component 504 and an adaptor manager 506. Adaptor component 504 (also referred to herein as an "IoT adaptor") manages the gateway's interaction with local devices 510a-c, and may include device-specific code components 508 to perform its processing with local devices 510a-c. Adapter manager 506 (also referred to herein as an "IoT adaptor manager") is used to manage the operations, versioning, and/or provisioning of local devices 510a-c and adaptor component 504. In some embodiments, gateway 502 processes incoming data with local analytics (e.g., to analyze operating conditions and to identify fluctuations). To the extent necessary, alerts and data readings can be sent in real-time.

The data collected by gateway 502 are sent over a network 550 to server 520. Server 520 efficiently receives data from potentially a multitude of client gateways. The server module parses the data and caches it locally to expedite data capture. Pre-processing of the data may be performed for filtering, applying simple or complex script-based rules, etc. The data may be stored in an internal database. The persisted data can be forwarded to a corporate, generic table store. The server module may also take action based on the result of rules applied on the data, such as calling a web service, invoking further more complex rules, sending control data back to devices, etc. A generic table format can be used to store the sensor data within the enterprise application ecosystem. Keeping the relevant data within the ecosystem allows the use of standard tools in the enterprise application, such as reporting tools and form design tools. This means that users can use their pre-existing tools and systems to process the data from the operations technology ("OT") side, which allows the user to use systems which they are well-versed in using to report on and add intelligence to the data that is captured. An open interface (e.g., a RESTful interface) enables the captured data to be enquired and allows the development of rich, responsive, up-to-date client interfaces.

At server 520, a logic processor 522 (also referred to herein as an "IoT logic processor") and a data processor 524 (also referred to herein as an "IoT data processor") are provided to implement analysis and alert processing. These components may include operations technology and industry-specific rules and scripts.

Server 520 may communicate with one or more applications 530. Such applications 530 may include, for example, functionality to implement inventory management, quality management, condition-based maintenance, and/or provide a visualization portal, as well as functionality of FIG. 3 for determining item detachment. Examples of these applications include, for example, Emergency Shutdown ("ESD") systems, Supervisor Control and Data Acquisition ("SCADA") systems, data analytics tools, BI ("business intelligence") tools, customer relationship management ("CRM") products, enterprise resource planning ("ERP") products, enterprise marketing products, financials applications, and/or procurement applications. The application products are hosted on computing hardware operated by the cloud provider.

Server 520 may also manage the storage of the collected data into one or more datastores 540. Datastore 540 includes any combination of hardware and software that allows for ready access to the data that is located at a computer readable storage device. For example, datastore 540 could be implemented as computer memory operatively managed by an operating system. The data in datastore 540 could also be implemented as database objects and/or files in a file system.

One or more users may exist at one or more user stations 554 that interact with the architecture 500. User station 554 includes any type of computing station that may be used to operate or interface with architecture 500. Examples of such user stations include, for example, workstations, personal computers, mobile devices, or remote computing terminals. The user station comprises a display device, such as a display monitor, for displaying a user interface to users at the user station. The user station also comprises one or more input devices for the user to provide operational control over the activities of the architecture 500, such as a mouse or keyboard to manipulate a pointing object in a graphical user interface to generate user inputs.

Either server 520 or the user at user station 554 may provide control signals to gateway 502 to control the operation of the gateway 502 and/or the local devices 510*a-c*. The control signals may be used to control any operation necessary at the gateway and/or local device 510*a-c*, including for example, to update and provision control software on the gateway and/or to control operation of the local device. Further details of the functionality of architecture 500, which can be used in conjunction with fleet item monitoring network/system 150 of FIG. 1, is disclosed in U.S. Pat. No. 10,382,294.

In embodiments, the generated sensor messages and cluster determinations are generated as a specialized data structure that includes attributes of sensors, vehicles, etc. In embodiments, the specialized data structure is in the form of an electronic document (e.g., an XML document) and is stored in database 17. A "data structure," as used herein, is an organization of data in a computing system that is stored in a memory, a storage device, or other computerized system. A data structure may be any one of, for example, a data field, a data file, a data array, a data record, a database, a data table, a graph, a tree, a linked list, and so on. A data structure may be formed from and contain many other data structures (e.g., a database includes many data records). Other examples of data structures are possible as well, in accordance with other embodiments.

As disclosed, embodiments significantly reduce time latency and improve accuracy for automatically tracking and detecting the detachment of trip entities. Therefore, a detachment event can more easily be detected in real time. Further, embodiments eliminate false positives for detachment detection. Further, embodiments reduce the use of memory and/or processing power of the computer because in the clustering algorithm of FIG. 4, for example, for each cluster a representative geo-location information ($g_m$, $t_m$) is saved. For a new incoming message, the distance function is computed against the representative point for each of the cluster, and the entity to the cluster which is the nearest cluster is assigned. In this way recomputing the cluster every time is avoided (i.e., improving the functioning of the computer) by saving the cluster information and incrementally updating the cluster information.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A method of monitoring items corresponding to a vehicle during a planned trip for transporting the items on the vehicle, the method comprising:
   determining a maximum speed of the vehicle;
   determining a last known first geo-location of a first item of the items, the first geo-location comprising a first location and corresponding first time;
   determining a last known second geo-location of a second item of the items, the second geo-location comprising a second location and corresponding second time;
   determining a reachability radius comprising a difference between the second time and the first time and multiplying the difference by the maximum speed;
   determining a distance between the first location and the second location; and
   when the distance is greater than the reachability radius, determining that the first item is detached from the second item and in response generating an alert.

2. The method of claim 1, wherein the vehicle comprises a truck and a truck trailer, and the first item is the truck trailer and the second item is transported within the truck trailer.

3. The method of claim 1, wherein the first item has a corresponding first Internet of Things (IoT) device that transmits the first geo-location and the second item has a corresponding second IoT device that transmits the second geo-location.

4. The method of claim 1, further comprising:
   determining a first cluster that includes the first item; and
   determining a second cluster that includes the second item.

5. The method of claim 4, further comprising:
   determining that the first cluster is a relevant cluster, wherein the relevant cluster includes the vehicle; and
   based on the relevant cluster, determining that the second cluster is detached from the vehicle.

6. The method of claim 1, wherein the maximum speed is based on at least one of: a maximum speed capacity of the vehicle, a speed limit of a route of the vehicle, or a traffic based speed of the route of the vehicle.

7. The method of claim 3, wherein the first geo-location is received as a message transmitted by the first IoT device and initially received by a gateway.

8. A non-transitory computer-readable medium having instructions stored thereon that, when executed by one or more processors, cause the processors to monitor items corresponding to a vehicle during a planned trip for transporting the items on the vehicle, the monitoring comprising:
   determining a maximum speed of the vehicle;

determining a last known first geo-location of a first item of the items, the first geo-location comprising a first location and corresponding first time;

determining a last known second geo-location of a second item of the items, the second geo-location comprising a second location and corresponding second time;

determining a reachability radius comprising a difference between the second time and the first time and multiplying the difference by the maximum speed;

determining a distance between the first location and the second location; and when the distance is greater than the reachability radius, determining that the first item is detached from the second item and in response generating an alert.

9. The computer-readable medium of claim 8, wherein the vehicle comprises a truck and a truck trailer, and the first item is the truck trailer and the second item is transported within the truck trailer.

10. The computer-readable medium of claim 8, wherein the first item has a corresponding first Internet of Things (IoT) device that transmits the first geo-location and the second item has a corresponding second IoT device that transmits the second geo-location.

11. The computer-readable medium of claim 8, the monitoring further comprising:

determining a first cluster that includes the first item; and
determining a second cluster that includes the second item.

12. The computer-readable medium of claim 11, the monitoring further comprising:

determining that the first cluster is a relevant cluster, wherein the relevant cluster includes the vehicle; and
based on the relevant cluster, determining that the second cluster is detached from the vehicle.

13. The computer-readable medium of claim 8, wherein the maximum speed is based on at least one of: a maximum speed capacity of the vehicle, a speed limit of a route of the vehicle, or a traffic based speed of the route of the vehicle.

14. The computer-readable medium of claim 10, wherein the first geo-location is received as a message transmitted by the first IoT device and initially received by a gateway.

15. A fleet monitoring system for monitoring items corresponding to a vehicle during a planned trip for transporting the items on the vehicle, the system comprising:

a sensor message receiving module;
one or more processors that execute instructions to, in response to receiving sensor messages from the message receiving module:

determine a maximum speed of the vehicle;
determine a last known first geo-location of a first item of the items, the first geo-location comprising a first location and corresponding first time;
determine a last known second geo-location of a second item of the items, the second geo-location comprising a second location and corresponding second time;
determine a reachability radius comprising a difference between the second time and the first time and multiplying the difference by the maximum speed;
determine a distance between the first location and the second location; and
when the distance is greater than the reachability radius, determine that the first item is detached from the second item and in response generating an alert.

16. The fleet monitoring system of claim 15, wherein the vehicle comprises a truck and a truck trailer, and the first item is the truck trailer and the second item is transported within the truck trailer.

17. The fleet monitoring system of claim 15, wherein the first item has a corresponding first Internet of Things (IoT) device that transmits the first geo-location and the second item has a corresponding second IoT device that transmits the second geo-location.

18. The fleet monitoring system of claim 15, further comprising:

determine first cluster that includes the first item;
determine a second cluster that includes the second item;
determine that the first cluster is a relevant cluster, wherein the relevant cluster includes the vehicle; and
based on the relevant cluster, determine that the second cluster is detached from the vehicle.

19. The fleet monitoring system of claim 15, wherein the maximum speed is based on at least one of: a maximum speed capacity of the vehicle, a speed limit of a route of the vehicle, or a traffic based speed of the route of the vehicle.

20. The fleet monitoring system of claim 15, further comprising a gateway that receives the sensor messages that are generated from the first IoT device.

* * * * *